United States Patent Office 3,184,453
Patented May 18, 1965

3,184,453
3-DIMETHYL-SUBSTITUTED INDOLINE DYESTUFFS
Roderich Raue, Leverkusen, Werner Muller, Cologne, and Oskar Weissel, Krefeld-Urdingen, Germany, and Max Coenen, deceased, late of Gruiten, Germany, by Ruth Coenen, Gerda Coenen, Barbara Coenen, and Hella Coenen, heirs, all of Gruiten, Germany, assignors to Farbenfabriken Bayer Aktiengesellschaft, Leverkusen, Germany, a German corporation
No Drawing. Filed Apr. 10, 1962, Ser. No. 187,149
6 Claims. (Cl. 260—240.4)

The present invention relates to novel methine dyestuffs. This invention is a continuation in part of our copending application 835,181, now abandoned, filed on August 21, 1959.

It is an object of the present invention to provide novel methine dyestuffs which are distinguished by very good fastness properties, especially excellent fastness to light. Another object of this invention is to provide a process for the dyeing and printing with said novel methine dyestuffs of materials made from synthetic polyamides and polyurethanes as well as from polyesters, preferably polyethyleneterephthalates. A further object is the provision of dyed and printed materials of the above-mentioned class which possess very good fastness properties.

The new methine dyestuffs of this invention correspond to the formula

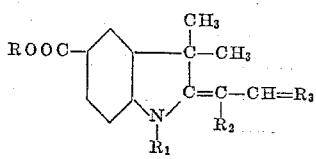

In this formula R stands for a lower alkyl group, preferably for —$CH_3$ or —$C_2H_5$, $R_1$ stands for hydrogen or lower alkyl, $R_2$ denotes hydrogen or —CN and $R_3$ stands for a radical of the pyrazolone series being linked to the 4-position of the pyrazolone moiety and being free of sulfonic acid groups.

The dyestuffs are obtainable, for instance, by condensing in preferably alkaline medium 2-methylene 5-carbo lower alkoxy indoline-ω-aldehydes which are disubstituted in 3-position by methyl groups and which may contain in 1-position lower alkyl substituents, with sulfonic acid group-free pyrazolones. The reaction of the starting components is carried out in the presence or in the absence of dissolving or diluting agents, with the addition of preferably alkaline catalysts, e.g., by refluxing the reaction components for several hours. Suitable dissolving and diluting agents are those which, under the conditions of the condensation reaction, act indifferent and which are able to sufficiently dissolve the reaction components; there may be mentioned for instance, methanol, ethanol, dioxane, tetrachloromethane, chlorobenzene and toluene.

As alkaline condensation agents there can be used, e.g., pyridine, diethylamine, potassium hydroxide, sodium hydroxide and especially piperidine.

In order to obtain the dyestuffs in a finely divided form, the reaction of the starting components may be carried out in the presence of an emulsifying agent, such as a condensation product of oleyl alcohol with 20 mols of ethylene oxide.

Suitable aldehyde components of the indoline series are among other lower alkyl esters of 1,3,3-trimethyl-5-carboxylic acid 2-methyleneindoline-ω-aldehyde, such as the methyl and ethyl esters.

As components of the pyrazolone series there may be used, for instance, 3-methyl-5-pyrazolone, 1-phenyl-3-methyl-5-pyrazolone, 1-phenyl-5-pyrazolone-3-carboxylic acid ethyl-ester, 1-phenyl-5-pyrazolone-3-carboxylic acid amide, 1-phenyl-5-pyrazolone-3-carboxylic acid, 1-(2'-chlorophenyl)-3-methyl-5-pyrazolone, 1-(3'-chlorophenyl)-3-methyl-5-pyrazolone, 1 - (2',5'-dischlorophenyl)-3-methyl-5-pyrazolone, 1 - (3'-nitrophenyl)-3-methyl-5-pyrazolone, 1-(4'-nitrophenyl)-3-methyl-5-pyrazolone, 1-(4'-methylphenyl)-3-methyl-5-pyrazolone.

The dyestuffs can also be prepared by a modified process when sulfonic acid group-free pyrazolone-4-aldehydes or their functional derivatives, preferably their N,N-disubstituted enamines, are condensed, in a preferably acid medium, with 2-methyleneindolines which carry two methyl groups in 3-position and one carbo lower alkoxy group in 5-position and which may be substituted in 1-position as indicated above. In this process, the reaction of the starting components is carried out in the presence or absence of suitable dissolving or diluting agents, with the addition of a catalyst of acid nature. As dissolving or diluting agents there may be employed, for instance, alcohols, tetrachloromethane, chlorobenzene, other aromatic compounds, and especially glacial acetic acid. Suitable acid condensation agents are, inter alia, glacial acetic acid, acetic acid anhydride, formic acid and sulfuric acid.

In the modified process for preparing the dyestuffs, the starting components are condensed by heating them in preferably glacial acetic acid for several hours at temperatures of about 90° C. to about 110° C. The dyestuffs generally precipitate in the cold; they can be isolated after pouring the reaction mixture in water. The addition of an emulsifying agent is sometimes desirable in order to obtain the dyestuffs in a most finely divided state.

As aldehyde components of the pyrazolone series the following components are useful in the modified process: 1-phenyl-3-methyl-5-pyrazolone-4-aldheyde, 3 - methyl-5-pyrazolone-4-aldehyde, 1-phenyl-5-pyrazolone-3-carboxylic acid ethylester-4-aldehyde, 1-phenyl-5-pyrazolone-3-carboxylic acid-amide-4-aldheyde, 1-phenyl-5-pyrazolone-3-carboxylic acid - 4 - aldehyde, 1-(2'-chlorophenyl)-3-methyl-5-pyrazolone-4-aldehyde, 1 - (3'-chlorophenyl)-3-methyl-5-pyrazolone - 4 - aldehyde, 1-(3'-nitrophenyl)-3-methyl-5-pyrazolone-4-aldehyde, 1-(4'-nitrophenyl)-3-methyl-5-pyrazolone-4-aldehyde and the enamine from dimethylformamide and 1-phenyl-5-pyrazolone-3-carboxylic acid-ethylester.

The novel methine dyestuffs yield valuable dyeings and prints on textile materials such as fibres, filaments, ribbons, etc., made from synthetic polyamides and polyurethanes as well as from aromatic polyesters, preferably polyethyleneterephthalates.

The dyestuffs are applied onto the above-mentioned materials according to methods which are known as such, for instance, from an aqueous dispersion at temperatures of between about 60° C. to about 100° C. The dyestuffs can also be used for dyeing in the so-called spinning process by adding them to a spinning solution before spinning. The dyeings and prints which are obtained by the improved process of the present invention are distinguished by brilliancy and excellent fastness to light.

The following examples are given for the purpose of illustrating the invention without, however, limiting it thereto. If not otherwise stated, the parts by weight are grams and the parts by volume are milliliters.

*Example 1*

25.9 parts by weight of 1,3,3-trimethyl-5-carbomethoxy-2-methyleneindoline-ω-aldehyde and 17.4 parts by weight of 1-phenyl-3-methyl-5-pyrazolone are refluxed with 200 parts by volume of ethanol for 10 minutes.

After the dropwise addition of 3 parts by volume of piperidine, the reaction mass is boiled at reflux condenser for further two hours. While cooling, the dyestuff precipitates in bright orange-red crystals which, after recrystallization from dioxane, melt at 231–232° C.

20 parts by weight of the dyestuff thus obtained are kneaded with 80 parts by weight of a condensation product of formaldehyde and naphthalene sulfonic acid and with little water, until fine division. The paste is then dried at 50° C. in vacuo.

Yarn made from ε-caprolactam are introduced at 50° C. into a dye-bath which contains per liter 0.66 gram of the dyestuff dispersion described above, and 0.5 gram of a condensation product of formaldehyde and naphthalene sulfonic acid. The liquor-to-goods ratio is 35 to 1. The dye-bath is heated to 100° C. within 30 minutes and dyeing continued at this temperature for one hour. The yarn is subsequently rinsed with water and dried. One obtains a greenish-yellow shade having excellent fastness to light.

Similar results are obtainable if, instead of the above prepared dyestuff, dyestuffs are used which are produced from the starting components indicated below:

We claim:
1. A compound of the formula

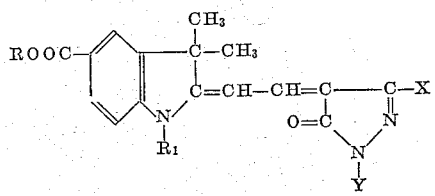

wherein R and $R_1$ each stand for a member selected from the class consisting of methyl and ethyl; X is a member selected from the group consisting of methyl, carbo lower alkylester, carbonamide and —COOH, Y is a member selected from the group consisting of hydrogen, phenyl, tolyl, monochloro phenyl, dichloro phenyl, nitro phenyl, amino phenyl, acetylamino phenyl and carboxy phenyl.

| Aldehyde component | Methylene compound | M.P. of the dyestuff, ° C. | Shade of the dye on polyamide fibres |
|---|---|---|---|
| 1,3,3-trimethyl-5-carbomethoxy-2-methyleneindoline-ω-aldehyde. | 3-methyl-5-pyrazolone | 266–270 | Yellowish orange. |
| 1-ethyl-3,3-dimethyl-5-carboethoxy-2-methylene-indoline-ω-aldehyde. | 1-phenyl-3-methyl-5-pyrazolone | 196–198 | Do. |
| 1,3,3-trimethyl-5-carbomethoxy-2-methyleneindoline-ω-aldehyde. | 1-(4'-methylphenyl)-3-methyl-5-pyrazolone | 274–275 | Orange. |
| 1,3,3-trimethyl-5-carbomethoxy-2-methylene-indoline-ω-aldehyde. | 1-(2'-chlorophenyl)-3-methyl-5-pyrazolone | 235–237 | Yellowish orange. |
| 1,3,3-trimethyl-5-carbomethoxy-2-methylene-indoline-ω-aldehyde. | 1-(3'-chlorophenyl)-3-methyl-5-pyrazolone | 215–217 | Do. |
| 1,3,3-trimethyl-5-carbomethoxy-2-methylene-indoline-ω-aldehyde. | 1-(2',5'-dichlorophenyl)-3-methyl-5-pyrazolone | 135–138 | Do. |
| 1,3,3,-trimethyl-5-carbomethoxy-2-methylene-indoline-ω-aldehyde. | 1-(3'-nitrophenyl)-3-methyl-5-pyrazolone | 290–292 | Do. |
| 1,3,3,-trimethyl-5-carbomethoxy-2-methylene-indoline-ω-aldehyde. | 1-(4'-aminophenyl)-3-methyl-5-pyrazolone | 149–152 | Do. |
| 1,3,3-trimethyl-5-carbomethoxy-2-methylene-indoline-ω-aldehyde. | 1-(3'-aminophenyl)-3-methyl-5-pyrazolone | 137–142 | Do. |
| 1,3,3-trimethyl-5-carbomethoxy-2-methylene-indoline-ω-aldehyde. | 1-(3'-acetylamino-phenyl)-3-methyl-5-pyrazolone | 289–290 | Orange. |
| 1,3,3-trimethyl-5-carbomethoxy-2-methylene-indoline-ω-aldehyde. | 1-(3'-carboxyphenyl)-3-methyl-5-pyrazolone | 255–256 | Yellowish orange. |
| 1,3,3-trimethyl-5-carbomethoxy-2-methylene-indoline-ω-aldehyde. | 1-phenylpyrazolone-(5)-3-carboxylic acid-amide | 275–276 | Reddish orange. |
| 1,3,3-trimethyl-5-carbomethoxy-2-methylene-indoline-ω-aldehyde. | 1-phenyl-5-pyrazolone-3-carboxylic acid (Na-salt) | | Yellowish orange. |

Example 2

4.04 parts by weight of 1-phenyl-3-methyl-5-pyrazolone-4-aldehyde, 4.60 parts by weight of 1,3,3-trimethyl-5-carbomethoxy-2-methyleneindoline and 20 parts by volume of acetic acid anhydride are refluxed for 10 minutes. After cooling the mixture is diluted with 20 parts by volume of isopropanol. The dyestuff precipitates in the form of red crystals; it corresponds to the product obtained by the method of Example 1.

When using in this example the components listed below, dyestuffs of similar properties are obtained.

| Pyrazolone component | Indoline component | M.P. of the dyestuff, ° C. | Shade of the dye on polyamide fibres |
|---|---|---|---|
| 1-(p-tolyl)-3-methyl-5-pyrazolone-4-aldehyde. | 1,3,3-trimethyl-5-carbomethoxy-2-methyleneindoline. | 274–275 | Orange. |
| 1-phenyl-3-carboethoxy 4-dimethyl-aminomethylene-5-pyrazolone. | 1,3,3-trimethyl-5-carbomethoxy-2-methyleneindoline. | 261–265 | Do. |

2. A compound of the formula

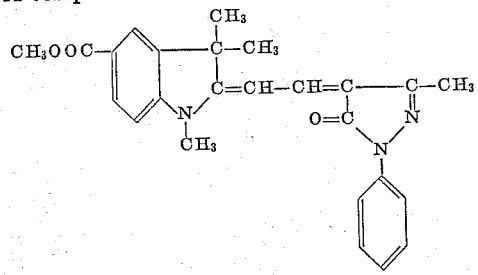

3. A compound of the formula

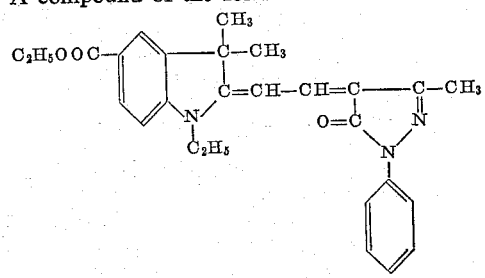

4. A compound of the formula

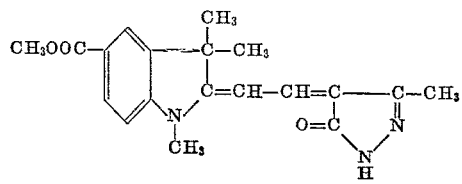

5. A compound of the formula

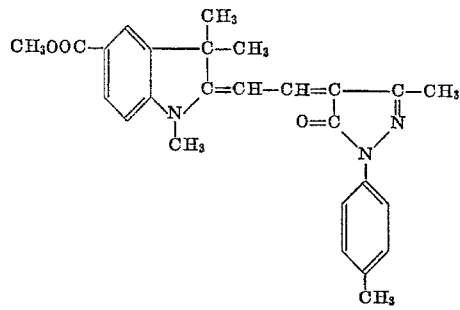

6. A compound of the formula

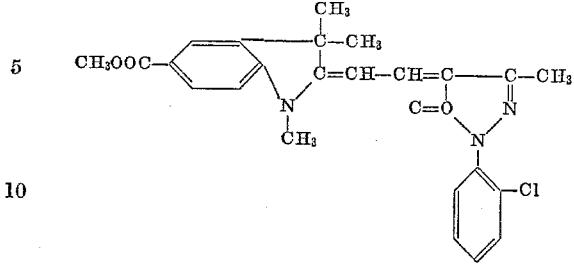

References Cited by the Examiner

UNITED STATES PATENTS

| | | | |
|---|---|---|---|
| 2,265,908 | 12/41 | Kendall | 260—240.4 |
| 2,280,253 | 4/42 | Muller et al. | 260—240.9 |
| 2,350,393 | 6/44 | Eistert et al. | 260—240.9 |
| 2,369,355 | 2/45 | Kendall et al. | 260—240.4 |
| 2,639,282 | 5/53 | Sprague et al. | 260—240.4 |
| 3,090,782 | 5/63 | Coenen et al. | 260—240.6 |

FOREIGN PATENTS

| | | |
|---|---|---|
| 366,964 | 2/32 | Great Britain. |
| 551,825 | 11/56 | Belgium. |

OTHER REFERENCES

Colour Index, vol. 3, 2nd ed., pages 3401 to 3404, The Society of Dyers and Colourists; Dean House, England (1956).

IRVING MARCUS, *Primary Examiner.*

NICHOLAS S. RIZZO, WALTER A. MODANCE,
*Examiners.*